Figures 1, 2:
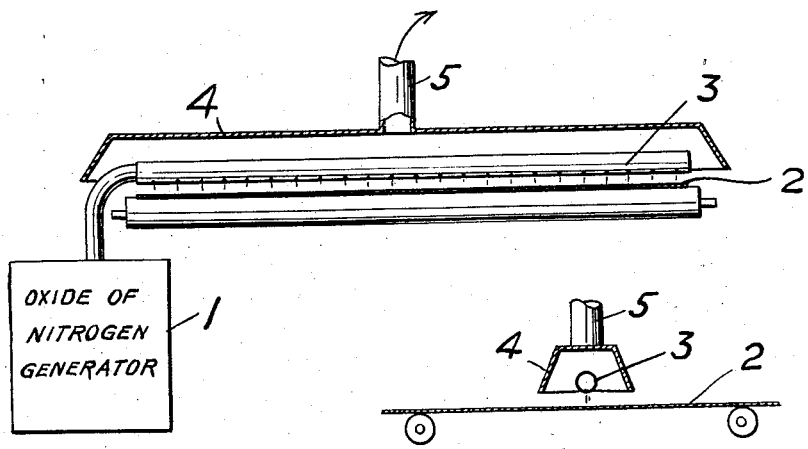

April 20, 1937.  A. L. GRAMMER ET AL  2,077,624

METHOD OF OPPOSING OFFSET IN PRINTING

Filed July 20, 1934

WITNESS:
Rob't P. Mitchel

INVENTORS
Allen L. Grammer
William W. Allen
BY
Augustus B. Stoughton
ATTORNEY.

Patented Apr. 20, 1937

2,077,624

UNITED STATES PATENT OFFICE 2,077,624

METHOD OF OPPOSING OFFSET IN PRINTING

Allen L. Grammer, Meadowbrook, and William Watson Allen, Aldan, Pa., assignors to The Curtis Publishing Company, Philadelphia, Pa., a corporation of Pennsylvania Application July 20, 1934, Serial No. 736,204

2 Claims. (Cl. 101—416)

One object of the present invention is to set an oleaginous material like printing ink in order to prevent it from offsetting when printing pressure is exerted on the reverse side of a web or sheet of paper or like material upon which the ink has been deposited.

Other objects of the invention will appear from the following description at the end of which the invention will be claimed.

Generally stated the invention comprises contacting a mixture of air and oxides of nitrogen in substantial concentration, particularly NO and NO₂ with the oleaginous material of newly printed ink in order to quickly set it and oppose offsetting.

The invention also comprises the improvements to be presently described and finally claimed.

In the following description reference will be made to the accompanying drawing forming part hereof and in which, Figs. 1 and 2 are a diagrammatic cross sectional view and a diagrammatic longitudinal sectional view to which reference will be made in explaining the invention.

The mixture of nitrogen oxides may vary over a wide range, depending upon the method of production, and still be useful as a drying agent. For example, if a solution of sodium nitrite has sulphuric acid added to it, nitrous acid is formed and immediately decomposes into water and N₂O₃ which in turn is unstable at room temperature and goes into a mixture of NO and NO₂. This gas will quickly set up or dry printer's ink.

Another example is the action of nitric acid on copper. The gas produced is mostly NO which changes into NO₂ when it comes into contact with the air. This NO and NO₂ mixture causes printing ink to quickly set up or dry.

Still another method is to bubble air through concentrated nitric acid and allow the air and oxides of nitrogen from the nitric acid to come into contact with the printing ink. This mixture will cause the ink to quickly set or dry.

These examples show the wide range over which the oxide of nitrogen may vary and still be an effective drying agent for oleaginous material, like printing ink.

The oxides of nitrogen in the presence of air appear to act as a catalyst and promote rapid oxidation of the oleaginous materials used in printing ink.

The rapid oxidation by oxide of nitrogen of freshly printed ink is of value not only in opposing or preventing offset but also in preserving or augmenting the gloss of the ink.

Referring to the drawing, 1 indicates an oxide of nitrogen generator. 2 indicates a freshly printed sheet or web. 3 is a means for discharging oxides of nitrogen in contact with the freshly printed ink on the surface of the web 2. 4 is a hood connected with an exhauster 5. The newly printed sheet or web 2 passes through an atmosphere of air and oxide of nitrogen which is localized by the hood 4 under which the gas is discharged onto the web and from which it is withdrawn through 5 to the exhauster and it can then be treated with a caustic solution, or, if desired, the gaseous mixture may be in whole or in part recirculated.

The oxides of nitrogen when chemically generated are free from ozone which is of objectionable odor and which is costly to produce, because its production requires expensive electrical apparatus operating at high voltage and at considerable expense.

It will be obvious to those skilled in the art that the invention is not limited to the details of procedure herein described or to matters of mere form, nor is the invention limited otherwise than may be required by the appended claims and the prior art.

We claim:

1. A method of opposing offset in printing which comprises flowing a stream consisting of air and nitrogen oxide in substantial concentration through a confined space and simultaneously passing a newly printed sheet or web through said space.

2. A method of opposing offset in printing which comprises passing a newly printed sheet or web through an atmosphere consisting of air and oxide of nitrogen in substantial concentration.

ALLEN L. GRAMMER.
WILLIAM WATSON ALLEN.